April 8, 1958   J. R. CONRATH   2,830,258
SELF-SATURATING REACTOR CIRCUITS
Filed Aug. 30, 1952

*INVENTOR.*
JULES R. CONRATH
BY *Clement J. Paynoras*
ATTORNEY

United States Patent Office 2,830,258
Patented Apr. 8, 1958

2,830,258

SELF-SATURATING REACTOR CIRCUITS

Jules R. Conrath, St. Louis, Mo., assignor to Vickers Incorporated, Detroit, Mich., a corporation of Michigan Application August 30, 1952, Serial No. 307,340

17 Claims. (Cl. 323—89)

This invention relates to power transmission and more particularly to self-saturating reactor circuits.

Self-saturating reactor circuits are saturable reactor circuits whose main reactor windings are supplied with intermittent unidirectional current by means of one way valves, for example half wave rectifiers, connected in series with the main windings. This produces what is known as self-saturation or internal positive feedback, creating a threshold magnetic level in the reactor core somewhere above zero. The main winding of a reactor is also known as the power winding or as the reactance winding.

The main winding M. M. F.'s generated by this intermittent current during the conducting time of the electric valve are generally referred to as being in the saturating direction. Metallic rectifiers, such as selenium rectifiers, are most frequently employed in circuits of this type. Such rectifiers are subject to leakage in the reverse or nonconducting direction of the cell, and since the rectifiers are in series with the reactor main windings, the leakage current traverses these windings and generates M. M. F.'s in the desaturating direction.

Since the reverse voltage on the rectifiers, and therefore the leakage current is proportional to the load voltage, the desaturating effect varies in such a way as to constitute an internal negative feedback.

The desaturating effect due to rectifier leakage currents is undesirable for several reasons. It reduces the gain of the magnetic amplifier, and since the rectifier leakage can vary with such factors as time and temperature, the loss of gain will be similarly variable. Because of these variables, rectifier leakage cannot be satisfactorily compensated for by introduction of positive feedback in the ordinary manner. Attempts to do this lead to instability if the rectifier leakage later decreases.

In accordance with the present invention, rectifier leakage current itself is utilized to provide M. M. F.'s in the nature of a variable positive feedback to partially or fully neutralize the desaturating effects of rectifier leakage current in self-saturating reactor circuits.

It is therefore an object of this invention to provide a novel means for neutralizing partially or fully the effects of rectifier leakage in self-saturating reactor circuits.

Another object of this invention is a novel means for providing positive feed back in a self-saturating reactor circuit.

Another object of the present invention is the provision of a novel arrangement in a self-saturating reactor circuit whereby rectifier leakage current is utilized to counter-act the desaturating effects of the leakage current.

Further objects and advantages of the present invention will be apparent from the following description, reference being had to the accompanying drawing wherein a preferred form of the present invention is clearly shown.

Figure 1:
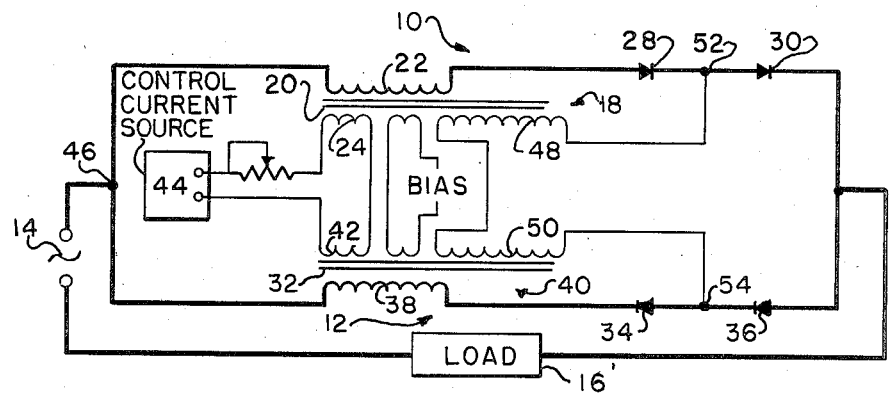
Figure 1 is a diagram illustrating one embodiment of the invention.

The circuit of Figure 1 is a "doubler" magnetic amplifier in which a pair of parallel-connected self-saturating reactor branches 10 and 12 are interposed between a source 14 of supply voltage and a load 16. Each of the branches 10 and 12 includes a saturable reactor and a pair of similarly poled rectifiers connected in series with the main winding of the reactor.

In branch 10 the reactor is indicated at 18 and comprises a saturable magnetic core element 20 carrying a main winding 22, and a control winding 24. The rectifiers in branch 10 are indicated at 28 and 30, and are serially connected with the main winding 22. Branch 12 likewise is provided with a reactor 32, and rectifiers 34 and 36 connected in series with the main winding 38 of the reactor. The core element 40 of the reactor 32 also carries a control winding 42 connected with control winding 24 to a source of control current 44.

The parallel branches 10 and 12 are connected to a supply input terminal 46 connected to the source 14, and to the load 16 which is connected to the supply source 14. Although the rectifiers in each branch are similarly poled, the rectifiers of one branch are oppositely or reversely related to the rectifiers of the other branch with respect to the supply voltage, and the other circuit connections are such that alternating current is supplied to the load 16, the respective branches contributing alternate half cycles in opposite directions to the load.

The circuit thus far described is conventional and is subject to the desaturating effects of rectifier leakage current flowing through the reactor main windings 22 and 38 during the nonconductive half cycle of the respective rectifiers. Although leakage current flows in the reverse direction of the rectifiers, this direction is referred to as the nonconducting direction and the leakage in this direction occurs during the nonconductive half of the rectifying cycle. In accordance with the present invention, the desaturating effects of the rectifier leakage current through the main windings are neutralized by utilizing the leakage current to generate M. M. F.'s in the reactor core in opposition to those generated by the leakage current in the main windings. In the specific embodiments shown, this is accomplished by passing the rectifier leakage current through an auxiliary winding on the reactor core in a direction to generate M. M. F.'s in the saturating direction. Thus the M. M. F.'s due the rectifier leakage current in the main winding and in the auxiliary winding oppose each other and can be made to fully cancel each other if both windings are provided with the same number of turns.

In Figure 1 the reactors are provided with such auxiliary windings as indicated at 48 and 50 and are connected in series opposition with respect to supply voltage fundamentals induced therein. The auxiliary windings are connected to circuit points between the rectifiers in each branch. These circuit points are indicated at 52 and 54, 52 being a junction between rectifiers 28 and 30, and 54 being a junction between rectifiers 34 and 36.

It is assumed herein that the conducting or forward direction of the rectifiers is in the direction of the arrow head of the rectifier symbol and that such conduction takes place when the electrode represented by the arrow head is at a positive potential. Thus, on the half cycle when the supply voltage is positive at the input terminal 46, rectifiers 28 and 30 will conduct in their forward direction allowing current to flow through the main winding 22 and the load 16. The output of the reactor main winding 22 during this conducting or operative half cycle is dependent on the firing angle of the reactor which in turn is determined by the flux condition of its core on the previous or nonconducting half cycle of the rectifiers 28 and 30. In addition to the flux of self-saturation, M. M. F.'s generated by the control current in the control winding, bias M. M. F.'s, if any, and M. M. F.'s due to leakage currents are factors in determining the net flux in the core just prior to the conducting half cycle of the associated rectifiers.

During the same half cycle, that is, when terminal 46 is positive, branch 12 is inoperative, its rectifiers 34 and 36 being in the reverse or nonconducting direction for this particular polarity. During this half cycle, rectifier 34 is subject to leakage, and the leakage current path may be traced as follows: from terminal 46, through main winding 38, rectifier 34, auxiliary windings 50 and 48, in that order, thence through rectifier 30 and the load 16 to the power supply 14. Examining this path it will be apparent that the leakage current flows through windings 38 and 50 generating opposing M. M. F.'s in the respective windings. Where these windings have the same number of turns, the M. M. F.'s due to rectifier leakage current in both windings cancel completely. Although both rectifiers 34 and 36 conduct load current in their forward direction when terminal 46 is negative, rectifier 36 is not included in the rectifier leakage current path on the nonconducting half cycle of branch 12, that is, when terminal 46 is positive.

When terminal 46 is negative, rectifiers 34 and 36 conduct, and the branch 12 furnishes current to the load. During the same half cycle (terminal 46 negative) branch 10 is nonconductive and the rectifier leakage current in that branch takes the following path: from load 16, through rectifier 36, windings 50 and 48 in that order, then through rectifier 28 (reverse direction) and main winding 22 to terminal 46. Thus the main and auxiliary windings 22 and 48, respectively, are traversed by the same leakage current, which generates desaturating M. M. F.'s in the main winding and saturating M. M. F.'s in the auxiliary winding, thereby neutralizing the magnetic effects of the rectifier leakage current. Just as in branch 12, one rectifier (30) is by-passed by the leakage current of rectifier 28.

Leakage current for either half cycle flows in a series path including the leaking rectifier and a rectifier in the other branch carrying the leakage current in its conducting direction. For example, rectifiers 36 and 28 are in the series leakage path of rectifier 28 and rectifier 36 carries the leakage current of rectifier 28 in its (rectifier 36) forward or conducting direction.

Although separate core elements are indicated in Figure 1, other well known core arrangements may be employed in practicing the invention. For example, main windings 22 and 38 in the circuit of Figure 1 may be carried by a single three-legged core with a single control winding and a single auxiliary winding as illustrated in Figure 2 in connection with another embodiment of the invention.

Figure 2:
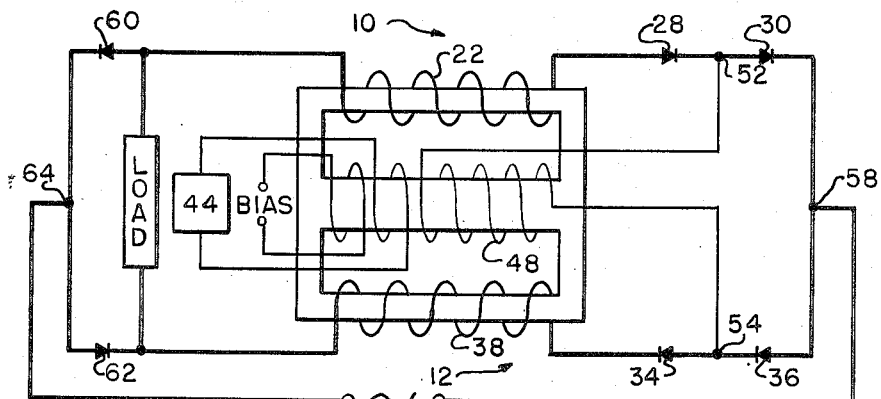
Figure 2 is a diagram illustrating another embodiment of the invention.

The circuit of Figure 2 is a full wave bridge type self-saturating magnetic amplifier delivering direct current into the load 16. As in Figure 1, the circuit of Figure 2 has two parallel self-saturating reactor branches 10 and 12 connected to a supply input terminal 58 and to the load 16. However, in this circuit because of the bridge connection completed by rectifiers 60 and 62, the load receives direct current. Branches 10 and 12 in Figure 2 correspond to branches 10 and 12 in Figure 1, and include the same circuit elements except that a single three-legged core carries the main windings 22 and 38 and common control and auxiliary windings 24 and 48 respectively. The auxiliary winding 48 performs the same function in the same way as the separate windings 48 and 50 do in Figure 1. Except that one common auxiliary winding is employed, the rectifier leakage currents flow in paths similar to those in Figure 1, and the leakage current in the common auxiliary winding generates M. M. F.'s in opposition to the M. M. F.'s generated by the leakage current flowing through the main windings as hereinbefore described. Starting at an input terminal 64 when it is positive, rectifier leakage current (of rectifier 34) will flow through rectifier 62, winding 38, rectifier 34, winding 48, and rectifier 30 to terminal 58. On the other half cycle when terminal 58 is positive, leakage current of rectifier 28 flows from terminal 58 through rectifier 36, winding 50, rectifier 28, main winding 22 and rectifier 60, to terminal 64. The core arrangement and plural control and auxiliary windings of Figure 1 may be employed in Figure 2.

Figure 3:
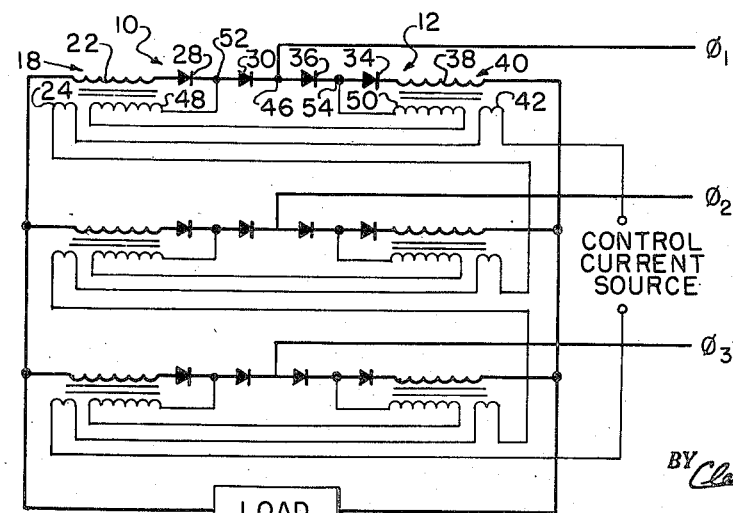
Figure 3 is a diagram showing an adaptation of the invention in a polyphase self-saturating reactor circuit.

Figure 3 illustrates a three-phase self-saturating bridge circuit embodying the invention. The pairs of reactor branches in each phase are similar to and operate in the same way as branches 10 and 12 of Figure 1 and Figure 2 to neutralize magnetic effects of rectifier leakage current. For example, the reactor branches and components thereof in phase one are designated by the same reference numerals used for corresponding parts in the preceding figures.

While the form of embodiment of the invention as herein disclosed constitutes a preferred form it is to be understood that other forms might be adopted, all coming within the scope of the claims which follow.

What is claimed is as follows:

1. A self-saturating magnetic amplifier comprising a reactor having a power winding and an auxiliary winding, a rectifier connected in series with said power winding for supplying unidirectional intermittent current to said winding in response to the application of a supply voltage, said rectifier being subject to current leakage in its reverse direction, which leakage current flows through said power winding, means for passing said leakage current through said auxiliary winding in a direction to provide magnetic effects opposed to the magnetic effects due to said leakage current in said power winding, and means for substantially preventing forward conduction current of said rectifier from flowing through said auxiliary winding, said auxiliary winding being connected to receive therethrough during the nonconducting half cycle of the rectifier only rectifier leakage current.

2. A magnetic amplifier comprising a pair of self-saturating reactor branches, each including a reactor power winding connected in series with a half wave rectifier, said rectifier being subject to current leakage in its reverse direction, which leakage current flows through said power winding, auxiliary winding means inductively coupled to said power windings, means for supplying said rectifier leakage current to said auxiliary winding means to provide magnetic effects opposed to the magnetic effects due to said leakage current in said power winding, and means for substantially preventing forward conduction current of said rectifiers from flowing through said auxiliary winding means.

3. A magnetic amplifier comprising a pair of parallel connected self-saturating reactor branches, each branch including saturable reactor means having a power winding and auxiliary winding means, and a pair of similarly poled rectifiers connected in series with said power winding, means for employing rectifier leakage current to compensate for the desaturating effects of rectifier leakage current in said power windings, said means comprising circuit connections from said auxiliary winding means to points between the rectifiers in each of said branches, and means including one rectifier of each of said pairs of rectifiers for substantially preventing forward conduction current of the other two rectifiers from flowing through said auxiliary winding means.

4. A magnetic amplifier comprising a pair of self-saturating reactor branches each having saturable core means, a power winding and auxiliary winding means carried by said core means, and a pair of similarly poled rectifiers serially connected to said power winding, means for supplying said auxiliary winding means with rectifier leakage current to provide magnetic effects in opposition to the magnetic effects due to the flow of rectifier leakage current through said power windings, said means comprising connections from said auxiliary winding means to circuit points between each of said pairs of rectifiers, and means including one rectifier of each of said pairs of rectifiers for substantially preventing forward conduction current of the other two rectifiers from flowing through said auxiliary winding means.

5. A magnetic amplifier comprising a pair of self-saturating reactor branches each having saturable core means, a power winding and auxiliary winding means carried by said core means, and a pair of similarly poled rectifiers serially connected to said power winding, said pairs of rectifiers being oppositely related, means for supplying said auxiliary winding means with rectifier leakage current to provide magnetic effects in opposition to the magnetic effects due to the flow of rectifier leakage current through said power windings, said means comprising connections from said auxiliary winding means to circuit points between each of said pairs of rectifiers, and means including one rectifier of each of said pairs of rectifiers for substantially preventing forward conduction current of the other two rectifiers from flowing through said auxiliary winding means.

6. A magnetic amplifier comprising: a pair of self-saturating reactor branches each having saturable core means, a power winding, and auxiliary winding means carried by said core means, and a pair of similarly poled rectifiers serially connected to said power winding, said pairs of rectifiers being oppositely related, and means for supplying said auxiliary winding means with rectifier leakage current to provide magnetic effects in opposition to the magnetic effects due to the flow of rectifier leakage current through said power windings, said means comprising connections from said auxiliary winding means to circuit points between each of said pairs of rectifiers, said points being on the same side of both power windings, and means including one rectifier of each of said pairs of rectifiers for substantially preventing forward conduction current of the other two rectifiers from flowing through said auxiliary winding means.

7. A self-saturating magnetic amplifier comprising power input connections for receiving alternating supply voltage, load connections, saturable core means, a pair of power windings carried by said core means, auxiliary winding means carried by said core means, a pair of similarly poled rectifiers connected in series with one of said power windings between a power input connection and a load connection, a junction between said rectifiers, a second pair of similarly poler rectifiers connected in series with the other power winding between a power input connection and a load connection, and a junction between said second pair of rectifiers, said pairs of rectifiers being oppositely related, said auxiliary winding means being connected to said junctions, said junctions being on the same side of both power windings, said power windings and auxiliary winding means being related to have opposing magnetic effects in response to rectifier leakage current.

8. A self-saturating magnetic amplifier comprising power input connections for receiving alternating supply voltage, load connections, saturable core means, a pair of power windings carried by said core means, auxiliary winding means carried by said core means, a pair of similarly poled rectifiers connected in series with one of said power windings between a power input connection and a load connection, and a second pair of similarly poled rectifiers connected in series with the other power winding between a power input connection and a load connection, said pairs of rectifiers being oppositely related, said auxiliary winding means being connected to points between each pair of similarly poled rectifiers, said power windings and auxiliary winding means being related to have opposing magnetic effects in response to rectifier leakage current.

9. A magnetic amplifier comprising input terminals for receiving alternating supply voltage, load terminals connectable to a load, a self-saturating reactor branch connected between an input terminal and a load terminal, a second self-saturating reactor branch connected between an input terminal and a load terminal, said branches having a common junction, each branch including a reactor power winding and two similarly poled rectifiers connected in series with the power winding of that branch, the rectifiers of one branch being oppositely related to the rectifiers of the second branch with respect to supply voltages received by said input terminals, and auxiliary winding means inductively related to said power windings, said auxiliary winding means being connected between circuit points located between the rectifiers in each of said branches, said auxiliary winding means and said power windings being related to have opposite magnetic effects in response to rectifier leakage current.

10. A magnetic amplifier comprising input means for receiving alternating supply voltage, a pair of self-saturating reactor branches connected to said input means, each including a reactor power winding and auxiliary winding means inductively related to the power winding, said branches being connected to a common junction, one branch having similarly poled first and second rectifiers connected in series with the power winding of that branch, said second rectifier being connected nearer to said junction than is the first rectifier, the second branch having similarly poled third and fourth rectifiers connected in series with the power winding of that branch, said fourth rectifier being connected nearer to said junction than is the third rectifier, the rectifiers of one branch being oppositely related to the rectifiers of the second branch with respect to supply voltages received by said input means, the power winding of each branch being subject to the flow therethrough of rectifier leakage current during the non-conductive half cycle of the rectifiers in the branch, and means for supplying said rectifier leakage current to said auxiliary winding means to provide magnetic effects opposed to the magnetic effects due to said leakage current in the power windings, said means comprising a leakage current path including said first and fourth rectifiers during one half cycle of said supply voltage and said second and third rectifiers on the other half cycle of said supply voltage, the second and third rectifiers being substantially bypassed by the leakage path during said one half cycle, and the first and fourth rectifiers being substantially bypassed by the leakage path during said other half cycle.

11. A magnetic amplifier comprising power input means for receiving an alternating supply voltage, output means connectable to a load, a self-saturating reactor circuit for controlling the flow of current from said input means to said output means, said circuit including two similarly poled rectifiers and a saturable reactor having a power winding connected in series with said rectifiers, said reactor having an auxiliary winding, a rectifier leakage current path including said windings connected in series with one of said rectifiers, said series connected windings being magnetically opposed, and a shunt path connected across the other of said rectifiers, said shunt path including a third rectifier and said auxiliary winding, the third rectifier being connected in series with the auxiliary winding, the third rectifier being oppositely related to the other rectifiers with respect to said supply voltage received by said input means.

12. A magnetic amplifier comprising power input means for receiving an alternating supply voltage, output means connectable to a load, a self-saturating reactor circuit for controlling the flow of current from said input means to said output means, said circuit including two similarly poled rectifiers and a saturable reactor having a power winding connected in series with said rectifiers, said reactor having an auxiliary winding, a third rectifier, a rectifier leakage current path including said windings connected in series with the third rectifier and one of said similarly poled rectifierss, said series connected windings being magnetically opposed, and a shunt path connected across the other of said similarly poled rectifiers, said shunt path including the third rectifier and said auxiliary winding, the third rectifier being connected in series with the auxiliary winding, the third rectifier being oppositely related to the other rectifiers with respect to said supply voltage received by said input means.

13. A self-saturating magnetic amplifier comprising a saturable core, a power winding on said core, an auxiliary winding on said core, first and second similarly poled rectifiers connected in series with said power winding, a rectifier leakage path including in series the power winding and a current path connected from a point between said rectifiers to a point on the opposite side of one of said rectifiers, said current path including said auxiliary winding and means for substantially preventing the flow of desaturating current through said current path, said windings being in series opposition with respect to rectifier leakage current.

14. A self-saturating magnetic amplifier comprising a saturable core, a power winding on said core, an auxiliary winding on said core, first and second similarly poled rectifiers connected in series with said power winding, a leakage path for one of said rectifiers including said power winding connected in series with a current path connected from a point between said rectifiers to a point on the other side of the other rectifier, said path including said auxiliary winding and a third rectifier oppositely related to said one rectifier, said windings being in series opposition with respect to rectifier leakage current.

15. A self-saturating magnetic amplifier comprising a saturable core, a power winding on said core, an auxiliary winding on said core, first and second similarly poled rectifiers connected in series with said power winding, a current path connected from a point between said rectifiers to a point on the opposite side of one of said rectifiers, said path including said auxiliary winding and a third rectifier oppositely related to the other rectifiers, said points being on one side of said power winding, said windings being in series opposition with respect to rectifier leakage current.

16. A self-saturating magnetic amplifier comprising power input connections for receiving alternating supply voltage, load connections, saturable core means, a pair of power windings carried by said core means, auxiliary winding means carried by said core means, a pair of similarly poled rectifiers connected in series with one of said power windings between a power input connection and a load connection, a junction between said rectifiers, a second pair of similarly poled rectifiers connected in series with the other power winding between a power input connection and a load connection, and a junction between said second pair of rectifiers, said auxiliary winding means being connected to said junctions, said junctions being on the same side of both power windings, said power windings and auxiliary winding means being related to have opposing magnetic effects in response to rectifier leakage current.

17. A self-saturating magnetic amplifier comprising power input connections for receiving alternating supply voltage, load connections, saturable core means, a pair of power windings carried by said core means, auxiliary winding means carried by said core means, a pair of similarly poled rectifiers connected in series with one of said power windings between a power input connection and a load connection, and a second pair of similarly poled rectifiers connected in series with the other power winding between a power input connection and a load connection, said auxiliary winding means being connected to points between each pair of similarly poled rectifiers, said power windings and auxiliary winding means being related to have opposing magnetic effects in response to rectifier leakage current.

References Cited in the file of this patent

UNITED STATES PATENTS 2,594,372     Wattenberger     Apr. 29, 1952

FOREIGN PATENTS 56,931     Netherlands     Sept. 15, 1944
589,341     Great Britain     June 18, 1947

OTHER REFERENCES

Publication: "Self-Saturation in Magnetic Amplifiers," W. J. Dornhoefer, AIEE Technical Paper, May 1949.